June 18, 1968   R. A. VINCENOT   3,388,588
PRESS FOR THE HYDRAULIC TESTING OF PIPES
Filed July 20, 1966   5 Sheets-Sheet 1

INVENTOR:
Raymond
Albert
VINCENOT
by: J. Delattre-Seguy
Attorney

June 18, 1968  R. A. VINCENOT  3,388,588
PRESS FOR THE HYDRAULIC TESTING OF PIPES
Filed July 20, 1966  5 Sheets-Sheet 2

INVENTOR:
Raymond Albert
VINCENOT
by: J. Delattre-Seguy
Attorney

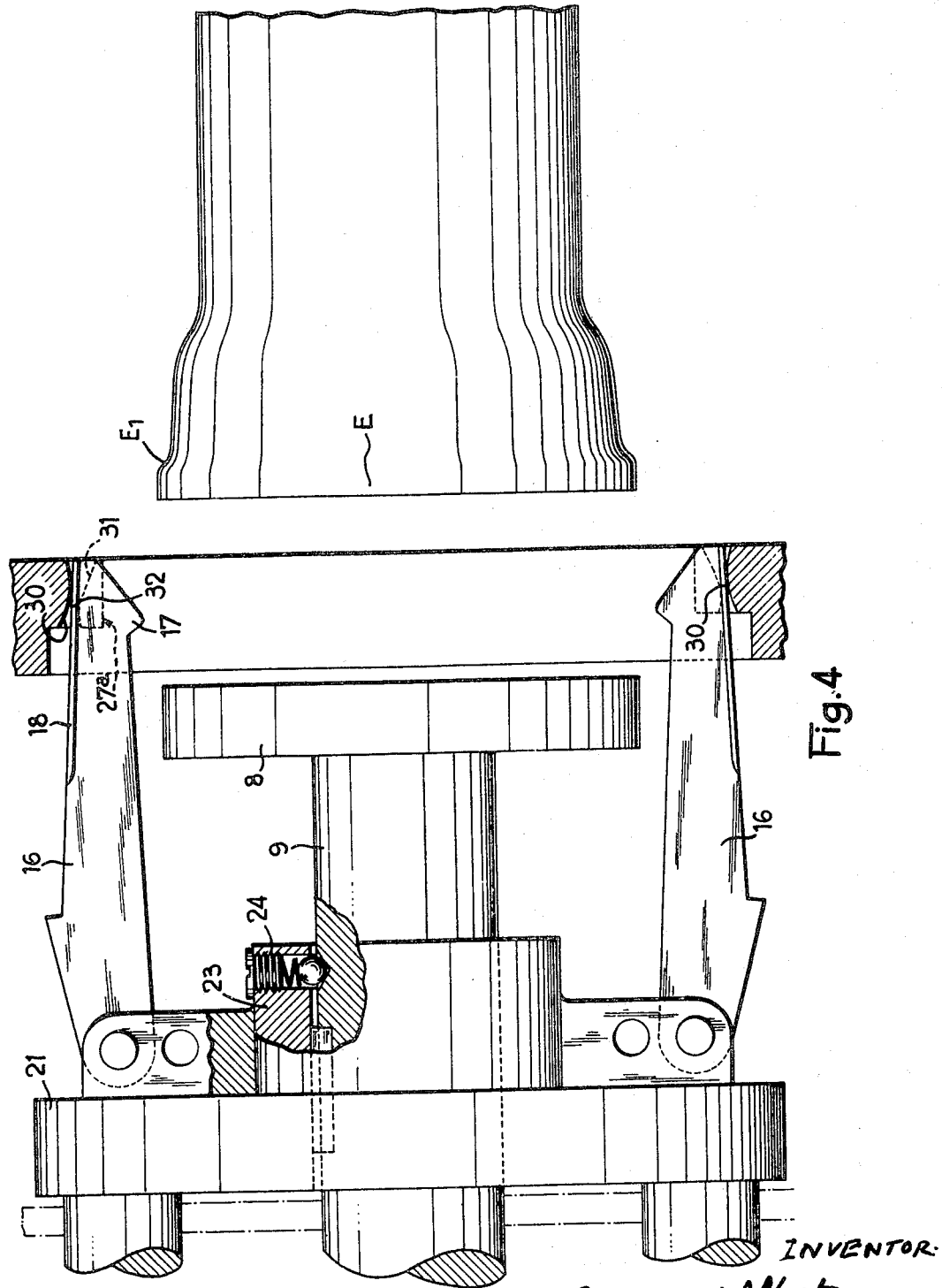

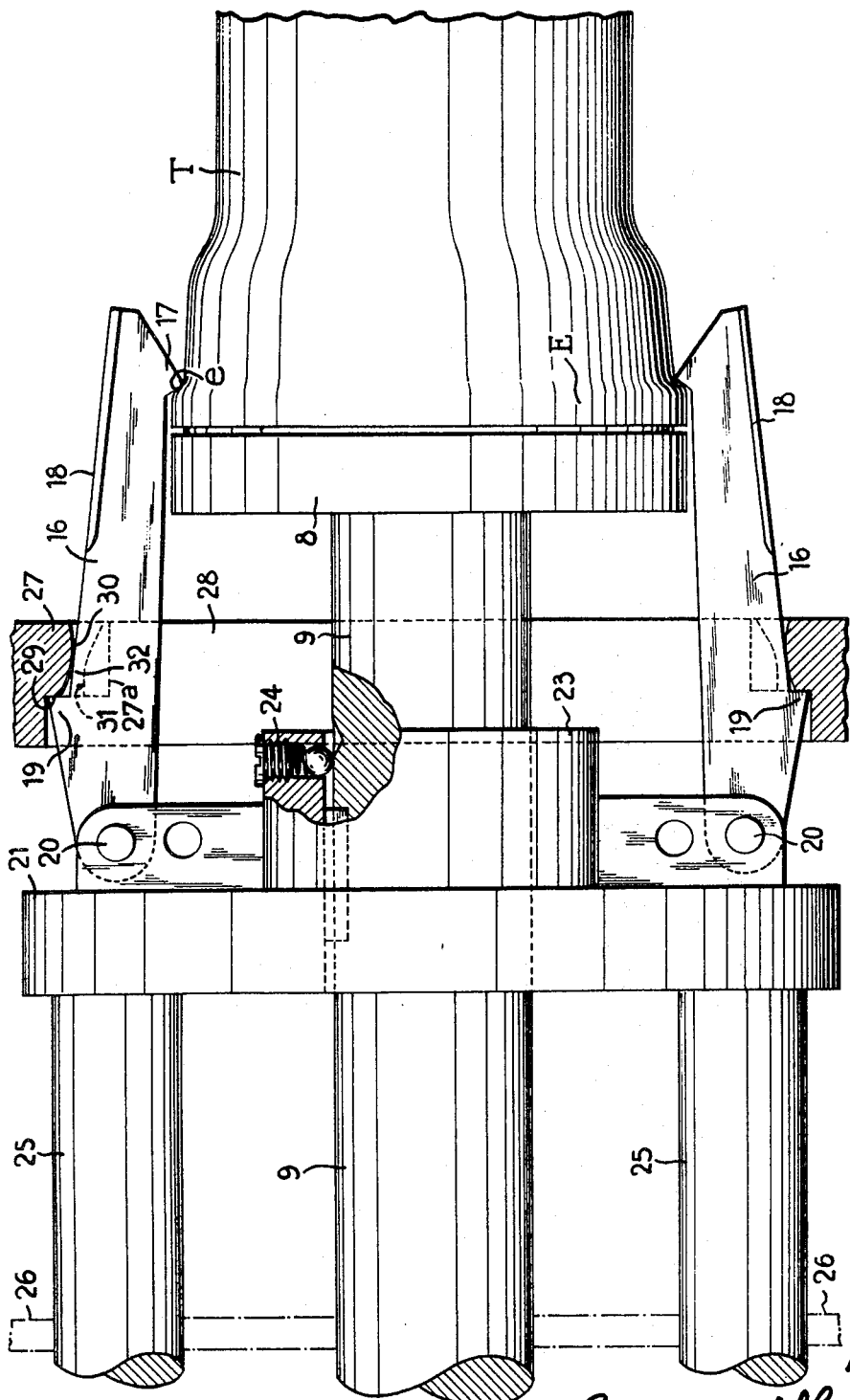

3,388,588
Patented June 18, 1968

3,388,588
PRESS FOR THE HYDRAULIC TESTING OF PIPES
Raymond Albert Vincenot, Pont-a-Mousson, France, assignor to Centre de Recherches de Pont-a-Mousson, Pont-a-Mousson, France, a French body corporate
Filed July 20, 1966, Ser. No. 566,513
Claims priority, application France, Aug. 6, 1965, 27,487
11 Claims. (Cl. 73—49.6)

ABSTRACT OF THE DISCLOSURE

A press for hydraulically testing a pipe having a socket, the press having at one end a fixed cylindrical element which fits around and seals the pipe end remote from the socket and, at the other end, pipe-closing means which axial thrust means apply against the entrance end of the socket, a counter-support device fixed relative to the stand of the press being engageable behind a shoulder on the socket of the pipe to hold the latter axially stationary when the pipe-closing means is applied against the entrance end of the socket.

---

The present invention relates to presses for the hydraulic testing of pipes and in particular metal pipes having a socket.

As is known, metal pipes having a socket, for example cast iron pipes, are, in the course of inspection or testing operations, subjected to high hydraulic pressures which considerably exceed the service pressure of the pipe so as to detect possible defects and eliminate pipes which do not withstand these testing pressures or show leakages.

Presses for hydraulic testing of known type comprise a fixed closing means on which is mounted the end of the pipe to be tested and a movable closing means applied strongly against the outer end of the pipe by a thrust-exerting jack. The water and the pressure is supplied by way of one of the two closing means. Such presses are equipped with a very large thrust jack so as to apply in a fluidtight manner the closing means against the ends of the pipes and withstand the high hydraulic testing pressures. These presses are furthermore equipped with large expensive jacks.

Further, owing to the enormous thrust exerted by the jack on one of the ends of the tested pipe, the other end abutting the fixed closing means, the pipe is subjected to large buckling stresses which tend to deform the pipe elastically. Consequently, certain cracks which might exist in the wall of the pipes are elastically closed up or tightened during the pressure test and withstand leakages so that they could escape notice. However, they once again open as soon as the pipe has been removed from the press and they no longer oppose leakage.

As known presses are actuated by high thrust jacks, their support must be reinforced by strong longitudinal struts. Such presses are therefore of large size, heavy and costly.

The object of the present invention is to provide a lightened hydraulic testing press capable, notwithstanding its lightness, of performing the same function as the known presses with a much smaller thrust force and consumption of energy.

This press for metal pipes having a socket, is of the type comprising fluidtight closing means for the ends of the pipe to be tested, one of said means being fixed and consisting of a cylinder in which the male end of the pipe is introduced without touching the inner end of the cylinder in the course of the test, the other closing means being movable and adapted to be applied against the end face of the socket of the pipe, and water supply means supplying water under a high pressure through at least one of said closing means, the movable closing means pertaining to the socket being combined with a counter-support device adapted to act as a support for the rear outer face of the socket of the pipe so as to retain said socket axially in opposition to the thrust of the movable closing means, while said device itself bears against the stand.

According to another feature of the invention, the movable closing means pertaining to the end face of the socket are actuated by a screw-and-nut mechanism.

Owing to this arrangement, the lightened press is not only cheaper but the pipes tested do not undergo deformation due to buckling and the test is more reliable.

Further features and advantages of the invention will be apparent from the ensuing description with reference to the accompanying drawings.

In the drawings:

FIG. 4 is a digrammatic view corresponding to FIG. 3 on an enlarged scale, of a part of the fluidtight pipe closing mechanism in position before closing, and FIG. 5 is a view similar to FIG. 4 of said mechanism in the fluidtight pipe-closing position and corresponding to its position shown in FIG. 1.

In the illustrated embodiment, the press is applied to the testing of cast iron pipes T having a bell or socket E and a cylindrical smooth male end U. This press comprises:

A stand A.

Closing means $B^1$ and $B^2$ for closing the ends of the pipe T.

A thrust mechanism C for exerting a thrust on the socket end of the pipe.

A counter-support device D for the socket end of the pipe, said device being the main novel feature of the machine.

*Stand.*—It comprises a base 1 of great length exceeding the length of the pipes to be tested, uprights 2 towards the ends of the stand and longitudinally-extending struts 3 interconnecting the uprights 2. Mounted on the stand A is a pair of rollers 4 for guiding the body of the pipes T. These rollers 4 are carried respectively by the lower and upper parts of the stand and are in facing relation to each other and spaced apart a distance corresponding to the diameter of the pipe. Each pipe to be tested is fed to the press, for example on a runway R, in a direction perpendicular to their longitudinal axis.

Figure 1:
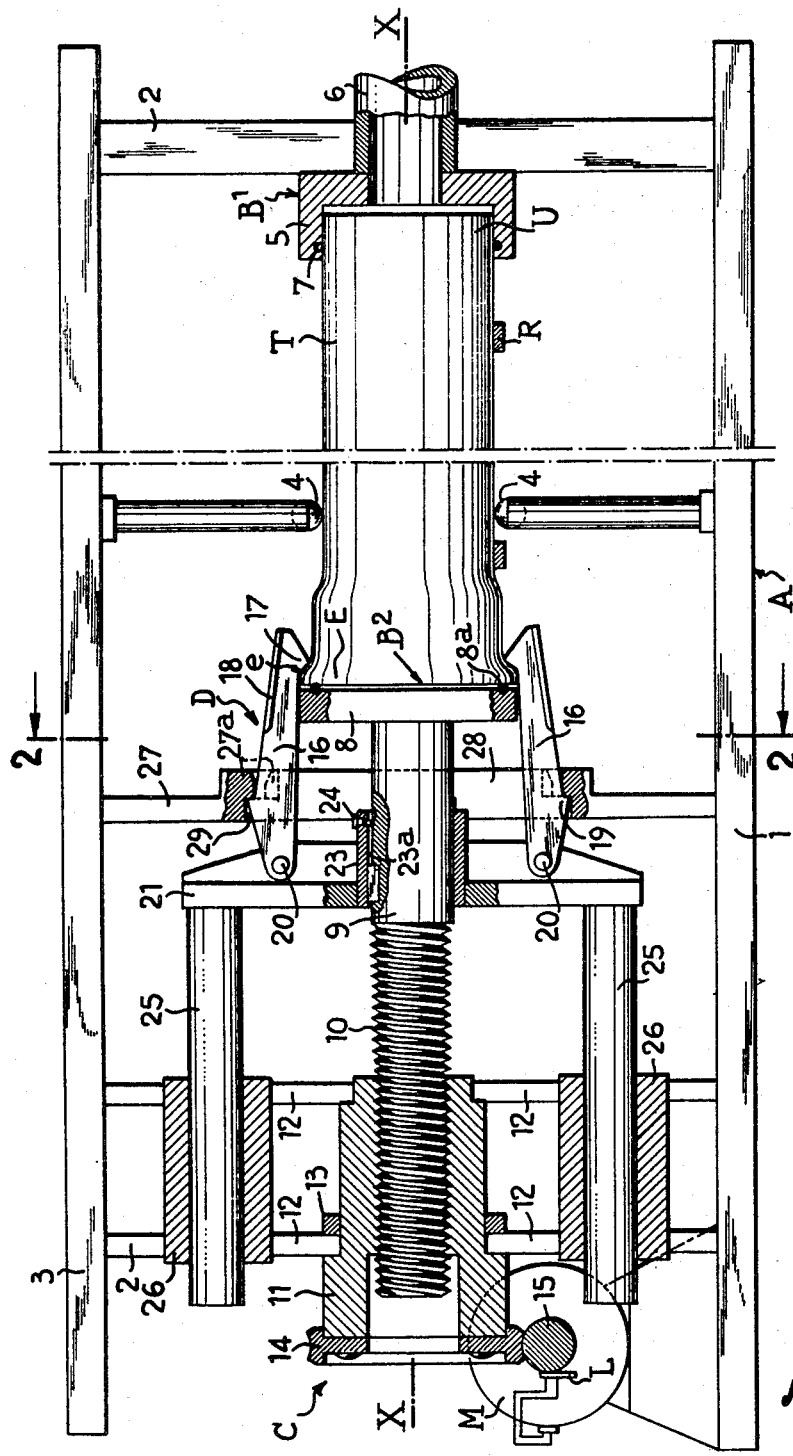
FIG. 1 is a diagrammatic elevational view, with parts in section, of a press according to the invention as shown in the course of testing a pipe.

*Pipe end-closing means $B^1$ and $B^2$ (FIG. 1).*—The means $B^1$ and relating to the male end U of the pipe T is secured to an upright 2 of the stand. It consists of a cylinder 5 having an axis X—X with the inner end of which communicates a conduit 6 supplying water under pressure for testing the pipe. The cylinder 5 has an inside diameter corresponding to the outside diameter of the male end of the pipes to be tested and includes an automatic sealing element, for example a toric sealing element 7 which projects from its inner peripheral face. The depth or axial length of the cylinder 5 is such as to permit the end U of the pipe T to be engaged therein and maintained in a fluidtight manner by the cylinder 5 without abutting the inner end face of the cylinder.

It will be mentioned that a bleed conduit for bleeding the air contained in the pipes is provided in the cylinder 5. For reasons of simplification this bleed conduit has not been shown.

Provided at the other end adjacent the socket or bell E of the pipe T, are the means B² consisting of a closing or thrust plate 8 which is coaxial with the cylinder 5 (axis X—X). The plate has a diameter corresponding to the diameter of the end face of the socket E and is provided with a toric sealing element 8a. An air bleeding orifice is provided in this plate. For simplification, this orifice has not been shown.

*Plate thrust mechanism C (FIG. 1).*—This plate 8 is mounted on a rod 9 which has an axis X—X and is extended by a screw 10 adapted to drive the plate 8 in the axial direction. The screw 10 co-operates with the sleeve 11 which constitutes a nut and is rotatable in bearings 12 carried by the uprights 2 of the stand and can be held stationary as concerns axial movement for example by a ring 13. A worm wheel 14 for rotating the sleeve 11 is secured to the latter for example on the end face thereof. This worm wheel meshes with a worm 15 which is driven by a motor M. This worm and worm wheel mechanism is equipped with a torque-limiting device L of known type which automatically stops the motor M and consequently the movement of the closing plate 8 as soon as the driving torque driving the sleeve or nut 11 exceeds a predetermined value corresponding to a given thrust on the end face of the socket of the pipe T.

*Counter-support device D for the socket of the pipe T (FIGS. 1, 2 and 5).*—This device ensures that the socket exerts a counter thrust on the closing plate 8 which is independent of the thrust exerted by the hydraulic pressure. This device also permits engaging the pipe T in, and extracting it from, the cylinder 5. The device comprises four pipe-engaging means or hooks 16 for retaining or exerting a counter thrust which are arranged on a circle around the axis X—X (around the socket of the pipe T to be tested) on a support plate described hereinafter. The levers are spaced a variable distance apart radially which can be less or greater than the diameter of the end face of the socket of the pipe T.

Each lever 16 comprises, from one end to the other thereof, a bearing nose 17 adapted to bear against the annular shoulder e of the bell or socket of the pipe, guide ribs or flanges 18 capable of co-operating with guide ramps, described hereinafter, so as to move the noses or hooks 16 towards or away from each other, so that they hook onto the socket of the pipe or separate therefrom, and a retaining shoulder or projection 19 adapted to bear against the stand, as explained hereinbefore.

Figure 2:
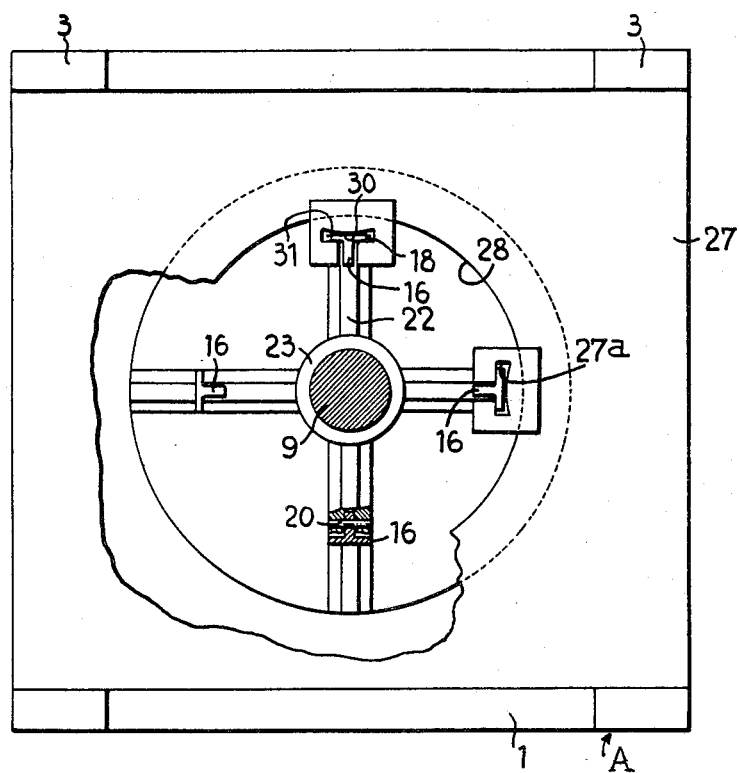
FIG. 2 is a cross-sectional view taken along line 2—2 of FIG. 1.

At their other ends, the levers 16 are pivotally mounted by pins 20 on the movable support plate 21 which is provided for this purpose with radially extending ribs 22 (FIG. 2). There are, for example, four pairs of such ribs disposed in the form of a cross and carrying the pivot pins 20. The support plate 21 is connected to a hub 23 which is slidable on the rod 9 carrying the closing plate 8. The rod 9 is slidably keyed at 23a to the hub 23 so as to prevent rotation of the rod relative to the hub. Further, the hub 23 can be connected to the rod 9 for axial movement by releasable connecting means or a ball locking system 24. The support plate 21 is guided in its axial movements by guide bars 25, for example two guide bars, which are slidable in sleeves 26 carried by the uprights 2 of the stand A.

The stand A is completed by a counter-support plate 27 secured to the base 1 and the struts 3. This plate 27 is parallel to the plates 8 and 21. It comprises (FIGS. 1 and 5) a centre opening 28 through which the thrust plate 8 and the levers 16 are adapted to travel, and four projections 27a disposed on two intersecting axes and projecting inwardly from the opening 28. Each projection 27a has a shoulder 29 facing the plate 21 and acting as an abutment for the projection 19 of one of the hooks 16 and guide ramps for the flanges 18 of the corresponding hook 16.

The ramps are double and in four groups. Large diameter ramps 30 are provided with a convex curvature facing the axis X—X, these ramps serving to guide the outer face or peripheral face of the flanges 18 of the hooks 16 and the outer edge of the levers 16 in the extension of the flanges 18. Ramps 31 of small diameter are also provided whose convex curvature faces outwardly. They serve to guide the inner face of the flanges 18 of the hooks 16.

The ramps 30, 31 form therebetween a passage 32 having a T-shaped section (FIG. 2) which corresponds to that of the hooks 16 in the region of the flanges 18. This passage has in the axial direction, namely in the section intersecting the axis X—X, a constricted section in the form of a venturi.

Figure 3:
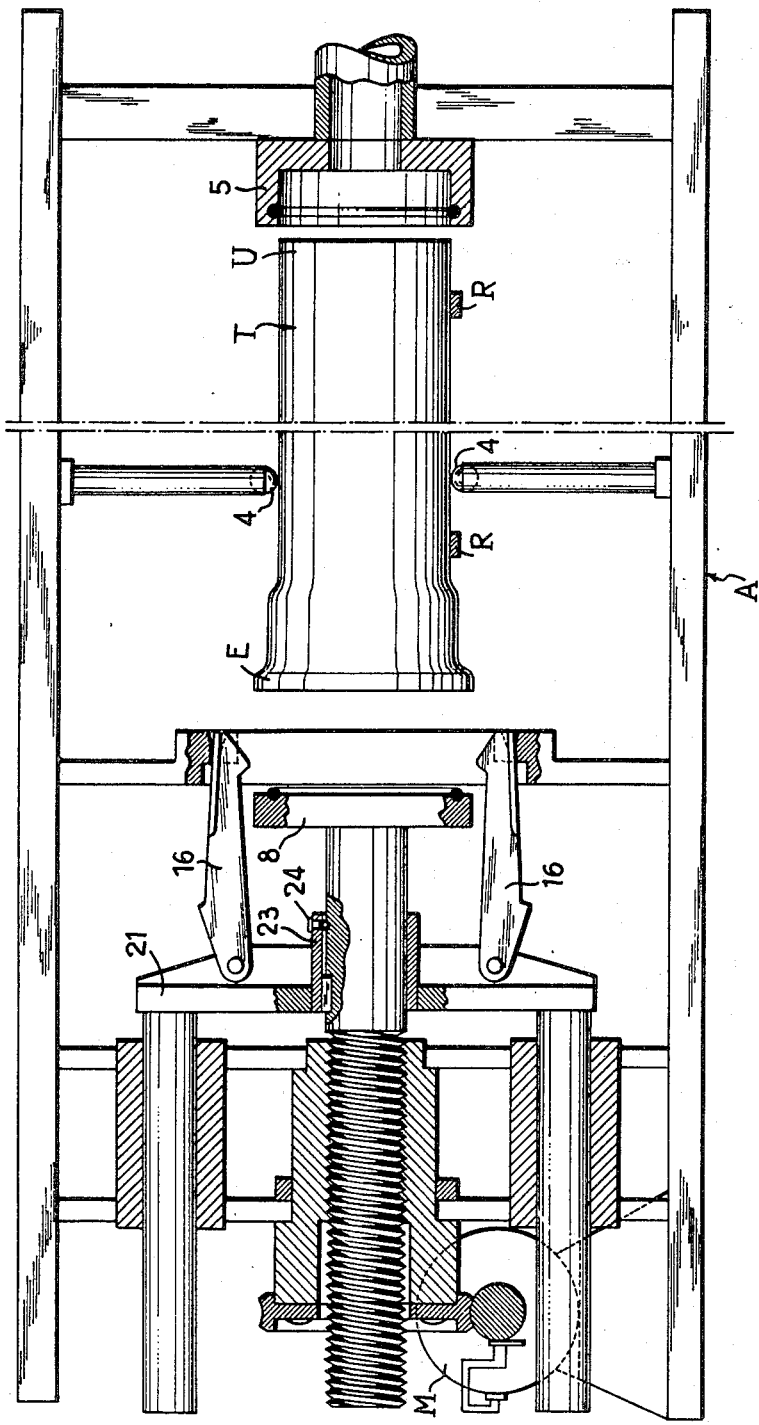
FIG. 3 is a view similar to FIG. 1 of the press before the fluidtight closing of the pipe.

The device operates in the following manner:

At the start it will be supposed that the press is in the position shown in FIG. 3, the thrust plate 8 being in its position withdrawn towards the thrust mechanism C and the hooks 16 being separated a distance exceeding the diameter of the end face of the socket of the pipe T (FIG. 4).

Consequently, the pipe T to be tested, which arrives on the runway R extending transversely of the press, can take up its position in axial alignment with the closing plate 8 and cylinder 5.

In this withdrawn position of the plate 8 and the hooks 16, the hub 23 of the movable support plate 21 is engaged on the rod 9 of the plate 8 by the locking device 24. The hooks 16 are urged apart by the ramps 30 and 31.

In particular, the small diameter ramps 31 prevent the lever 16 located above the axis X—X from dropping in the direction of the latter under the effect of gravity whereas the large diameter ramps 30 co-operate with the outer face of the flanges 8 and limit the separation of the other levers.

A pipe is therefore brought by means of the runway R between the guide rollers 4 and into alignment with the axis X—X of the cylinder 5 and the thrust face 8.

The motor M is started up, the closing plate 8 moves towards the end of the socket E of the pipe T and drives along therewith the plate 21 carrying the hooks 16 owing to the ball locking device 24. The plate 8 reaches the end face of the socket of the pipe T and then urges the latter axially and inserts the male end U of the pipe into the cylinder 5. Simultaneously, and before the male end has reached the inner end face of the cylinder 5, the flanges 18 of the hooks 16 pass through the passage 32 between the ramps 30 and 31 and the noses 17 of the hooks 16, which pass beyond the circular shoulder e of the bell or socket, move together owing to the effect of the ramps 30 and act as retaining means for the shoulder of the pipe socket. When the projections 19 of the hooks abut the retaining shoulders 29 of the projections 27a of the counter-support plate 27 (FIGS. 1 and 5), the hooks 16 and their support plate 21 stop moving forwardly. The hooks 16 are then in a position closed onto and around the shoulder e of the socket and prevent the pipe from being urged against the inner end face of the cylinder 5.

However, when the axial displacement of the pipe stops, the closing plate 8 is not yet in contact in a fluid tight manner with the end plate of the socket E. As the motor M continues to rotate, the rod 9 of the plate 8 becomes detached from the hub 23 of the support plate 21 by an elastic withdrawal of the ball of the locking device 24 and the plate 8 continues to move forwardly in the direction of the end face of the socket of the pipe. There is, moreover, only a small travel to effect in order to obtain a fluidtight connection on the end face of the socket. Indeed, after the plate 21 stops moving, th thrust plate 8 encounters without delay a counter-thrust reaction of the end face of the socket which is retained by the noses 17 of the hooks 16. When this reaction is such that the worm and worm wheel speed reducing mechanism driving torque exceeds the limit at which the torque limiter L is set, the motor M automatically stops. The closing plate 8 is then in contact in a fluidtight manner with the end face of the socket of the pipe.

The pipe is then ready for testing. Air is bled therefrom in the known manner, then water under high pressure is supplied by way of the conduit 6. A perfect seal is ensured adjacent the male end U by the cylinder 5 and the sealing element 7 and at the socket end by the closing plate 8 which is also provided with a sealing element 8a.

The behavior of the pipe under high pressure is carefully checked. After the test the conduit 6 is connected to the exhaust and the pipe T emptied of water. Then the motor M is started up in the opposite direction to the preceding direction. The thrust plate 8 moves rearwardly without however driving the plate 21 or the hooks 16 since the hub 23 is disconnected from the rod 9 of the plate 8. After a small rearward travel of the plate 8 the ball locking device 24 becomes re-engaged with the rod 9 under the action of its spring. As the plate 8 continues to move rearwardly it drives the plate 21 and the hooks 16. In moving rearwardly the hooks engaged on the flange e of the socket exert a traction on this flange and withdraw the male end of the pipe T from the cylinder 5. In the course of this rearward movement, the flanges 18 of the levers 16 are once more engaged in the passage 32 between the ramps 30 and 31. The hooks 16 therefore gradually move apart and finally completely release the pipe. The latter can now be withdrawn from the press on the runway R.

The main advantages of the testing press according to the invention are the following:

Owing to the counter-support device, which is the main novel feature of the invention (plate 27, hooks 16, movable support plate 21, hub 23 and the ball locking device 24), the thrust on the end face of the socket is transmitted directly to the stand through the hooks 16 and the plate 27 so that it is only the outer flange of the socket which is compressed, the rest of the body of the pipe being subjected to no longitudinal compressive stress.

Consequently, the pipe T undergoes no buckling force and, moreover, the possible cracks or small hollows are not elastically deformed which could result in their temporary closure during the test and thus their escaping notice.

Moreover, owing to the use of a screw-and-nut thrust mechanism for shifting the movable plate against the pipe, the movable plate is held stationary by the non-reversibility of the system and therefore cannot move rearwardly under the effect of the hydraulic pressure prevailing in the pipe. Consequently, it is sufficient that the plate 8 exert against the end face of the socket the thrust strictly necessary for the sealing of the socket joint. The thrust varies in accordance with the diameter of the pipe and is on the order of $25-30 \times 10^3$ newtons (about 2.5–3 tons/force) for a pipe having a nominal diameter of 300 mm.

The use of the torque limiter moreover permits adjusting this thrust so that it is just that necessary, bearing in mind the nominal diameter of the pipes to be tested. The thrust exerted on the ends or closing means by the pressure within the pipe is of course proportional to the area of the bore of the pipe and is withstood by the struts 3 of the stand, which must be calculated accordingly. For example, with respect to a pipe having a nominal diameter of 300 mm. subjected to a testing pressure on the order of 80 bars (about 80 kg./sq. cm.) this thrust is on the order of $800 \times 10^3$ newtons (about 80 tons/force). With a press of conventional type in which the whole of the pipe is compressed between the two closing ends by a hydraulic jack, the latter in order to resist the thrust and preclude the rearward displacement of the movable plate under the effect of this thrust, must, bearing in mind inevitable leakages in the jack, develop a thrust force on the order of $1100 \times 10^3$ newtons (about 110 tons/force). Thus, it can be seen that owing to the invention the force on the struts is reduced in the proportion of around 25–30%. Further, the cost of a thrust mechanism of the type described is incomparably less than that of a thrust device mechanism employing a jack with a high-pressure pump operating throughout the test.

Owing to the hooks 16 and their projections 19 and the locking device 24, it is possible to interconnect the hooks 16 and the thrust plate 8 which is essential in order to permit the latter to be applied in a fluidtight manner on the end face of the socket without exerting the buckling force on the pipe T.

Owing to the ramps 30 and 31 and the appropriate shape of the levers 16 and their flange 18, the hooks 16 automatically move towards and away from each other.

Owing to the thrust plate 8, the pipe T fed along the runway R can be engaged by its male end U in the cylinder 5.

Owing to the hooks 16, after testing the male end U can be disengaged from its cylinder 5 without need to employ additional handling apparatuses.

The thrust plate 8 and the hooks 16 therefore advantageously also form an axial handling device for the pipes T.

Although the press according to the invention has been described with a screw-and-nut thrust mechanism which offers the maximum advantages, it is possible to employ a jack thrust device as in conventional presses. However, in this case, the advantage of the absence of buckling of the pipe is lost since it is the jack which must withstand the total thrust force and this requires the use of a jack of large size provided with a high-pressure feed device.

Although a specific embodiment of the invention has been described, many modifications and changes may be made therein without departing from the scope of the invention in the appended claims.

Thus, the press is adaptable to various diameters of pipe in providing cylinders 5 and plates 8 which are interchangeable in accordance with the various diameters and different radially spaced mounting apertures for the pivot pins 20 of the ends of the hooks 16 on the radial ribs 22 of the support plate 21.

Instead of the projections 27a comprising ramps 30 and 31 being rigid or integral with the counter-support plate 27 these ribs 27a could be attached to the plate 27 and radially adjustable thereon diametrally of the pipes to be tested.

The press could be adapted to various lengths of pipes in providing in the known manner a detachable sleeve of suitable length which is fitted at one end in the cylinder 5 and has at the other end a shape identical to that of the cylinder 5 and receives the end of the shorter pipe.

Having now described my invention what I claim as new and desire to secure by Letters Patent is:

1. A press for the hydraulic testing of a pipe having a body, a socket at one end and an outer shoulder on the socket, said press comprising in combination a stand, fixed fluidtight closing means for closing the end of the pipe remote from said socket comprising a cylindrical element fixed relative to the stand and adapted to encompass the pipe without bearing axially on the latter in the course of testing, movable fluidtight pipe closing means movable relative to the stand between a withdrawn position in which the pipe can be moved transversely into axial alignment with the fixed closing means and movable closing means and a fluidtight pipe closing position against the end face of said socket, water supply means supplying water under high pressure through one of said closing means, and a counter-support device comprising a support element fixed relative to the stand, pipe-engaging means combined with the support element and movable between an inoperative position, in which they are not engaged with the pipe and allow the pipe to be moved transversely into and out of a position of axial alignment with the fixed closing means and the movable closing means, and an operative position in which the pipe-engaging means are held stationary axially of the pipe by the support element and in which the pipe-engaging means engage the pipe behind said shoulder and retain the pipe axially in opposition to the thrust of the movable closing means, and releasable connecting means operatively connecting the movable closing means to the pipe-engaging means and adapted to be released when said pipe-engaging means reach said operative position whereby the movable closing means, in moving axially toward the pipe, shift the pipe-engaging means to said operative position just before the movable closing means exert a final axial thrust against the said end face of the socket and reach said fluidtight pipe closing position.

2. A press for the hydraulic testing of pipes having a socket, said press comprising a stand, fixed fluidtight closing means for closing the end of the pipe remote from said socket comprising a cylindrical element fixed relative to the stand and adapted to encompass the pipe without bearing axially on the latter in the course of testing, movable fluidtight pipe closing means movable relative to the stand and adapted to be applied against the end face of said socket, water supply means supplying water under high pressure through one of said closing means, and a counter-support device combined with said movable closing means and fixed relative to the stand and adapted to act as a support for the rear outer face of said socket so as to retain said socket axially in opposition to the thrust of said movable closing means, said counter-support device comprising hooks for hooking said rear outer face of the socket, a support plate on which said hooks are pivotably mounted, a disengageable locking device interconnecting the support plate and said movable closing means, said hooks being provided with abutment means for abutting the stand.

3. A press as claimed in claim 2, wherein each of the hooks comprises a pipe socket-retaining nose and a projection, said press further comprising an abutment plate which is fixed relative to said stand and against which said projections abut.

4. A press as claimed in claim 3, wherein each of the hooks comprises guide flanges and said abutment plate comprises guide ramps which engage said flanges.

5. A press as claimed in claim 4, wherein said guide ramps comprise two convex guide ramps for each hook, namely an outer ramp and inner ramp forming therebetween a constricted passage having a venturi shape in a plane parallel to the axis of the pipe and a T shape in a plane perpendicular to said axis for the passage of the flanges of the corresponding hook.

6. A press as claimed in claim 4, wherein said ramps are integral with said abutment plate.

7. A press as claimed in claim 4, wherein said ramps have abutment faces for said projections and are attached to said abutment plate.

8. A press as claimed in claim 2, wherein said support plate comprises sets of radially-spaced apertures whereby said hooks can be pivotally mounted on the support plate in various radial positions for testing pipes of different diameters.

9. A press for the hydraulic testing of a pipe having a body, a socket at one end and an outer shoulder on the socket, said press comprising a stand, fixed fluidtight closing means for closing the end of the pipe remote from said socket comprising a cylindrical element fixed relative to the stand and adapted to encompass the pipe without bearing axially on the latter in the course of testing, movable fluidtight pipe closing means comprising a closing plate movable relative to the stand and adapted to be applied against the end face of said socket, water supply means supplying water under high pressure through one of said closing means, a counter-support device comprising a support element fixed relative to the stand, pipe-engaging means combined with the support element and movable between an inoperative position in which they are not engaged with the pipe and allow the pipe to be moved transversely into and out of axial alignment with the fixed closing means and the movable closing means and an operative position in which the pipe-engaging means are held stationary axially of the pipe by the support element and in which the pipe-engaging means engage the pipe behind said shoulder and retain the pipe axially in opposition to the thrust of the movable closing means, and releasable connecting means operatively connecting the movable closing means to the pipe-engaging means and adapted to be released when said pipe-engaging means reach said operative position whereby the movable closing means, in moving axially toward the pipe, shift the pipe-engaging means to said operative position just before the movable closing means exert a final axial thrust against said end face of the socket and reach said fluidtight pipe closing position, and thrust means for moving the movable closing means comprising a screw secured to said closing plate, a rotatable nut axially stationary on said stand screwthreadedly engaged on said screw and driving means operatively connected to said nut for rotating said nut and thrusting said closing plate against said socket.

10. A press as claimed in claim 9, further comprising a torque limiter interposed between said nut and said driving means.

11. A press for the hydraulic testing of a pipe having a body, a socket at one end and an outer shoulder on the socket, said press comprising in combination a stand, fixed fluidtight closing means for closing the end of the pipe remote from said socket comprising a cylindrical element fixed relative to the stand and adapted to encompass the pipe without bearing axially on the latter in the course of testing, movable fluidtight pipe closing means movable relative to the stand between a withdrawn position in which the pipe can be moved transversely into axial alignment with the fixed closing means and the movable closing means and a fluidtight pipe closing position against the end face of said socket, water supply means supplying water under high pressure through one of said closing means, and a counter-support device comprising a support element fixed relative to the stand, pipe-engaging means combined with the support element and movable transversely and axially of the pipe between an inoperative position in which they are non-engaged with the pipe and allow the pipe to be moved transversely into and out of axial alignment with the fixed closing means and the movable closing means and an operative position in which the pipe-engaging means are held stationary axially of the pipe by the support element and in which the pipe-engaging means engage the pipe behind said shoulder and retain the pipe axially in opposition to the thrust of the movable closing means, and releasable connecting means operatively connecting the movable closing means to the pipe-engaging means and adapted to be released when said pipe-engaging means reach said operative position whereby the movable closing means, in moving axially toward the pipe, shift the pipe-engaging means to said operative position just before the movable closing means exert a final axial thrust against said end face of the socket and reach said fluidtight pipe closing position, said movable pipe closing means being capable of engaging said end face of the pipe and axially inserting the pipe in said cylindrical element before the pipe-engaging means reach said operative position, the press further comprising means guiding said pipe-engaging means in a path substantially parallel to the axis of the pipe in the first part of the movement of the pipe-engaging means from said operative position to said inoperative position whereby the pipe-engaging means are capable of axially disengaging the pipe from said cylindrical element before releasing the pipe in said inoperative position thereof.

References Cited

UNITED STATES PATENTS 971,191 9/1910 Gray _____ 73—49.8
1,847,185 3/1932 Hise _____ 73—49.5
2,445,876 7/1948 Fullerton _____ 73—49.5

DAVID SCHONBERG, *Primary Examiner.*

LOUIS R. PRINCE, *Examiner.*

JEFFREY NOLTON, *Assistant Examiner.*